UNITED STATES PATENT OFFICE.

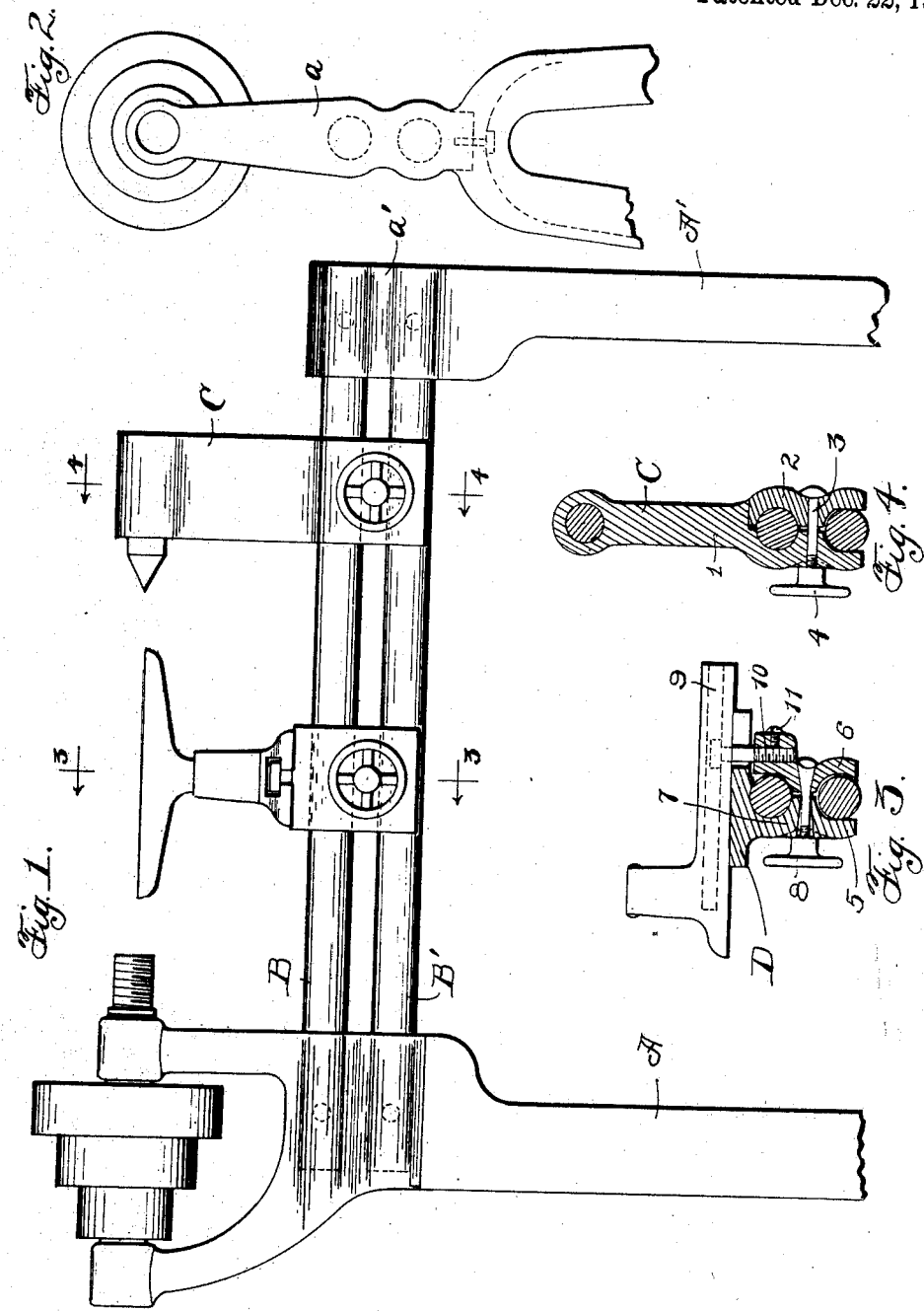

EDGAR H. SHELDON, OF CHICAGO, ILLINOIS.

LATHE.

No. 907,418.  Specification of Letters Patent.  Patented Dec. 22, 1908.

Application filed September 20, 1901. Serial No. 75,897.

*To all whom it may concern:*

Be it known that I, EDGAR H. SHELDON, citizen of the United States, residing at Chicago, in the county of Cook and State of Illinois, have invented a certain new and useful Improvement in Lathes, (Case 2,) of which the following is a full, clear, concise, and exact description, reference being had to the accompanying drawings, forming a part of this specification.

The object of my invention is to provide a simple, practical and inexpensive construction of lathe.

In the accompanying drawings, Figure 1 is a side elevation of the upper portion of a lathe embodying my invention; Fig. 2 is an end view of the left hand end of the lathe shown in Fig. 1; Figs. 3 and 4 are vertical sections taken on lines 3—3 and 4—4 respectively in Fig. 1.

The lathe which I have shown in the drawings to illustrate my invention, is provided with end uprights A and A' which are conveniently made fork-shaped so as to provide each of them with two legs. Upright portions a, a' are secured to the uprights A, A'. A pair of horizontal rods or bars B, B' are extended between the uprights A and A' and firmly secured thereto. The rods or bars B, B' are desirably cold rolled shafting, although they can of course, be made of any other material. They are preferably secured to the uprights A, A' by casting them into same.

The tail stock C consists of an upright portion 1 having recesses adapted to accommodate the horizontal bars B, B', as shown in Fig. 2, and a clamping section 2 also having recesses for said bars B, B', and a clamping bolt 3 passed through the lower portion of the upright 1 and through the clamp 2 and provided with a small hand wheel 4. The recess for the lower bar B' formed at the lower ends of the upright 1 and clamp 2, is open at the bottom so as to permit the proper arrangement of the tail stock upon the bars and the removal of the same therefrom. The adjustment of the tail stock is accomplished by turning the wheel 4 to an extent to loosen the clamp 2 and sliding the stock along the bars B, B', after which the wheel 4 is again turned to clamp the device in position.

The carriage D consists of an angle piece 5 having horizontal and vertical portions, the latter of which is provided with recesses for the bars B, B', a clamping piece 6 also provided with recesses for said bars, and an adjusting bolt 7 and wheel 8 therefor. This general arrangement of clamping to the horizontal bars, is similar to that used in connection with the tail stock, as previously described. The horizontal portion of the angle piece 5 is adapted to receive a rest 9 which is secured thereto by a bolt 10 passing through said horizontal portion and into an opening provided for it in the upper portion of the clamp 6. The bolt 10 is held in adjustment by a set screw 11. The adjustment of the clamp 6 by the hand wheel 8, it will be seen, will also adjust the bolt 10 so as to clamp the rest 9 firmly upon the piece D. Thus by one adjustment of the wheel 8 the carriage is locked in adjustment along the bars B, B', and the rest 9 is locked to the carriage.

It will be seen that a lathe thus constructed, is exceedingly simple, and can be made at very low expense. The number of parts is exceedingly small, the bed consisting simply of two uprights and two horizontally arranged bars extending between the same. The necessity of employing rods having longitudinal grooves, is avoided and thereby the great expense of cutting such longitudinal grooves in hard steel rods, is not incurred. For the horizontal rods or bars comparatively inexpensive material, such as cold rolled shafting, can be employed and by casting this into the uprights, the cost of constructing the bed is made very low. The head stock and carriage can be cheaply made, consisting of but few parts and these very simple.

What I claim as my invention is:—

1. A lathe comprising a pair of uprights, and a bed consisting of a couple of metal bars or rods, arranged one above the other, said sections having their ends embedded in uprights, substantially as described.

2. The combination with a lathe bed consisting of a pair of bars or rods, of a carriage therefor, having a clamping device, whereof the clamping members are arranged on opposite sides of said bar or rod, and one of the same has an inclined transversely sliding connection with one of the bars or rods, means for drawing the clamping members together so as to cause a sliding movement relatively to said member and bar or rod, and a rest carried by said carriage and connected with said slidable clamping member, whereby the rest is tightened at the same time the clamp is tightened, substantially as described.

3. The combination with a bed consisting of a pair of bars or rods arranged one above the other, of a carriage D having a portion 7 disposed at one side of said bars or rods, a clamping member 6 located on the other side thereof, said clamping member 6 having an inclined surface coöperating with the upper bar or rod to permit a transversely sliding movement relatively thereto, a threaded adjusting device for connecting the clamp 6 with the portion 7 and clamping said clamp 6 against said bars or rods, a rest 9 carried by the carriage, and a threaded bolt 10 extended between the clamp 6 and carriage 9, whereby the rest and carriage are simultaneously locked in position by the threaded device connecting the clamp 6 and portion 7, substantially as described.

In witness whereof, I hereunto subscribe my name this 16th day of Sept. A. D., 1901.

EDGAR H. SHELDON.

Witnesses:
A. MILLER BELFIELD,
MAX W. FABEL.